(12) United States Patent
Ganesan et al.

(10) Patent No.: US 6,691,223 B1
(45) Date of Patent: Feb. 10, 2004

(54) PROCESSING FULL EXCEPTIONS USING PARTIAL EXCEPTIONS

(75) Inventors: Elango Ganesan, Sunnyvale, CA (US); Ricardo Ramirez, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/365,260

(22) Filed: Jul. 30, 1999

(51) Int. Cl.[7] .................................................. G06F 9/48
(52) U.S. Cl. ........................................ 712/244; 712/233
(58) Field of Search ................................ 712/244, 214, 712/215, 235, 243, 205, 20, 22, 233

(56) References Cited

U.S. PATENT DOCUMENTS

| | | | | |
|---|---|---|---|---|
| 5,949,996 A | * | 9/1999 | Atsushi | 712/244 |
| 6,006,030 A | * | 12/1999 | Dockser | 712/227 |
| 6,122,729 A | * | 9/2000 | Tran | 712/244 |
| 6,282,636 B1 | * | 8/2001 | Yeh et al. | 712/218 |
| 6,378,067 B1 | * | 4/2002 | Golliver et al. | 712/244 |

* cited by examiner

*Primary Examiner*—Henry W. H. Tsai
(74) *Attorney, Agent, or Firm*—Blakely, Sokoloff, Taylor & Zafman LLP

(57) ABSTRACT

The present invention is a method and apparatus for processing full exceptions in a partial parallel processor operating on parallel operands which form into N groups. The method comprising: (a) generating P partial exception states for P partial exceptions from the partial parallel processor operating on the N groups of the parallel operands; the P partial exceptions correspond to the full exceptions; and (b) handling the P partial exceptions based on the P partial exception states.

51 Claims, 9 Drawing Sheets

PROCESSING FULL EXCEPTIONS USING PARTIAL EXCEPTIONS

BACKGROUND

1. Field of the Invention

This invention relates to microprocessors. In particular, the invention relates to exception generation.

2. Description of Related Art

Modern microprocessors have been developed with advanced architectures to support demanding applications such as scientific computations, multimedia, imaging, and graphics. Recently, there is a trend in designing processors with parallel processing capability. An example of parallel architectures is single-instruction-multiple-data (SIMD) architecture.

An SIMD architecture typically has computational units that can process multiple data items in parallel or simultaneously. For example, an SIMD machine may define a floating-point (FP) packed data type that contains four 32-bit single-precision (SP) numbers packed as a 128-bit quantity. In this architecture, the SIMD machine has an execution engine that executes on all four SP numbers simultaneously.

Exceptions are conditions that indicate some abnormal behavior or boundary conditions of the machine. In computational units, exceptions are typically generated as a result of boundary conditions, incorrect operands or results. In SIMD machines, full exceptions are to be generated for all the data items involved in the computations.

When a processor is designed to be compatible with an SIMD machine, the processor should maintain the same full exception generation to ensure correct result.

Therefore there is a need in the technology to provide a simple and efficient method to process full exceptions as provided by an SIMD machine.

SUMMARY

The present invention is a method and apparatus for processing full exceptions in a partial parallel processor operating on parallel operands which form into N groups. The method comprising: (a) generating P partial exception states for P partial exceptions from the partial parallel processor operating on the N groups of the parallel operands; the P partial exceptions correspond to the full exceptions; and (b) handling the P partial exceptions based on the P partial exception states.

BRIEF DESCRIPTION OF THE DRAWINGS

The features and advantages of the present invention will become apparent from the following detailed description of the present invention in which.

DESCRIPTION

The present invention is a method and apparatus for processing full exceptions using partial exceptions. The technique divides the full parallel operands into groups of operands to be processed by a partial exception processor. The partial exception processor contains speculative and architectural storages to store the exception states and processes the input operands in stages. Exception states as detected in a previous stage can be unrolled to maintain compatibility with processors having full exceptions. In the last stage, the partial exception processor combines all the exception states and commits all speculative storage to architectural storage.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention. In particular, the term "pre-exception" refers to an exception that occurs prior to a process, e.g., a computational process. Similarly, the term "post-exception" refers to an exception that occurs after or as a result of a process, e.g., a computational process. When the process is a computational process, such as computations done by a parallel floating-point unit, the terms "pre-exception" and "post-exception" are used interchangeably with "pre-computation exception" and "post-computation exception", respectively.

In the following description, a micro architecture is described. This micro architecture is part of a processor that is designed to be compatible of an existing processor. The existing processor has full exception processing capabilities with computation units capable of processing N elements simultaneously. The current micro-architecture has only a partial processing capability having computational units capable of processing less than N elements simultaneously. The current micro architecture is typically an out-of-order (OOO) machine. The micro operations (micro ops) are executed and the results are logged in a re-order queue (ROQ). An instruction retirement unit (IRU) retires the micro ops in order. The IRU of the micro architecture maintains two copies of the exception flags of the existing processor, a speculative copy in a speculative storage and an architectural copy in an architectural storage.

As the IRU retires completed micro ops in the ROQ in order, if there were an exception in the execution of a micro op, an appropriate microcode handler is invoked. The IRU includes a logic circuit that produces the correct handler entry point. If there were no exceptions, on non end of macro (EOM) the micro op speculative storage is updated. On EOM the micro op speculative storage is updated and the value is copied to the architectural storage.

Figure 1:
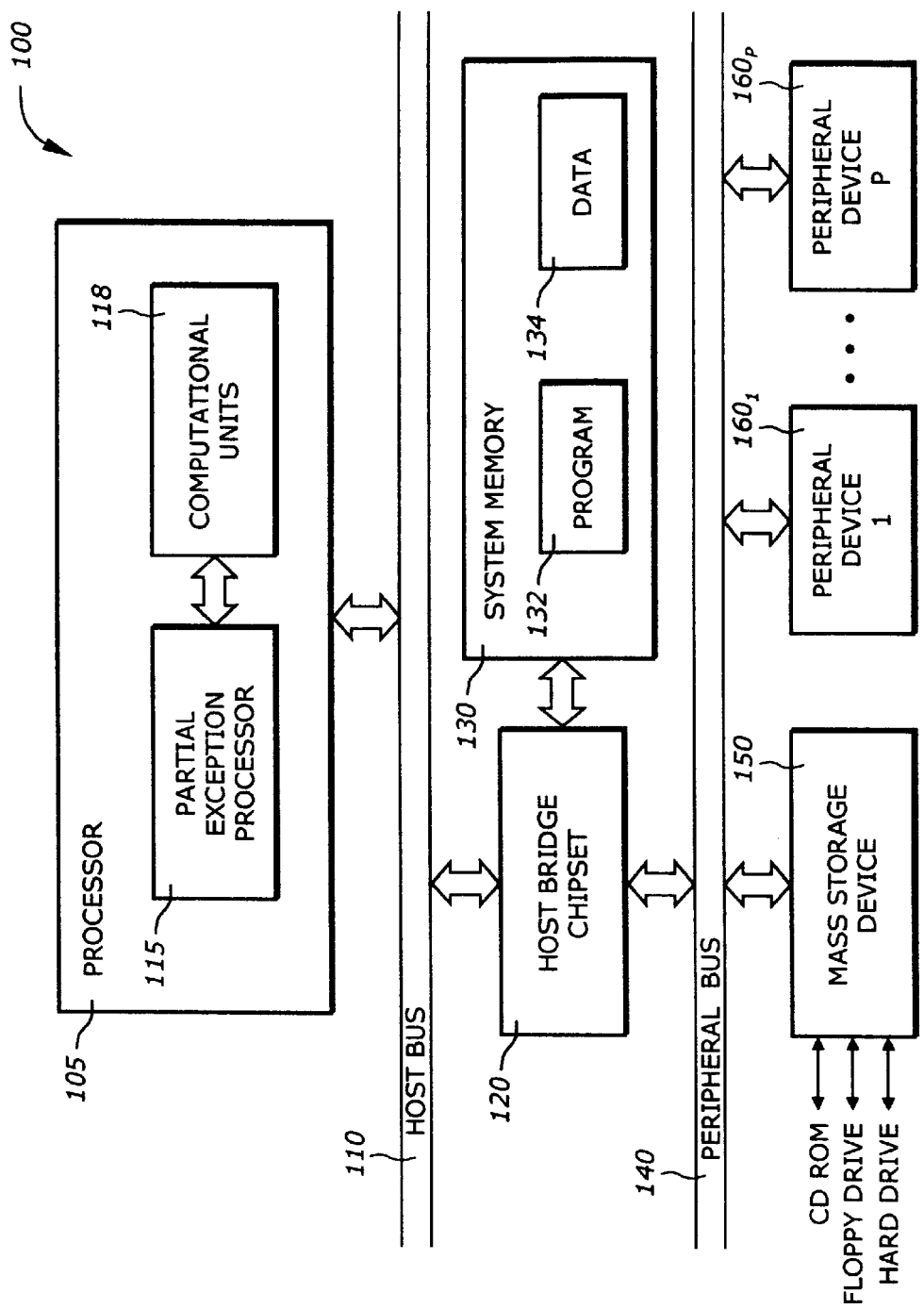
FIG. 1 is a diagram illustrating a system in which one embodiment of the invention can be practiced.

FIG. 1 is a diagram illustrating a system 100 in which one embodiment of the invention can be practiced. The computer system 100 include a processors 105, a host bus 110, a host bridge chipset 120, a system memory 130, a peripheral bus 140, K peripheral devices $160_1$ to $160_K$, and a mass storage device 150.

The processor 105 represents a central processing unit of any type of architecture, such as complex instruction set computers (CISC), reduced instruction set computers (RISC), very long instruction word (VLIW), or hybrid architecture. The invention could be implemented in a multi-processor or single processor computer system. The processor 105 includes a partial exception processor 115 and computational units 118. The partial exception processor 115 processes full exceptions to be compatible with processors having full exception capabilities. The computational units 118 are parallel processing elements that perform computations on the partial operands. In one embodiment, the computational units 118 are parallel floating-point processors.

The host bridge chipset 120 includes a number of interface circuits to allow the host processor 105 access to the system memory 130, and the peripheral bus 140. The system memory 130 represents one or more mechanisms for storing information. For example, the system memory 130 may include non-volatile or volatile memories. Examples of these memories include flash memory, read only memory (ROM), or random access memory (RAM). The system memory 130 includes a program storage 132 and a data storage 134. Of course, the system memory 130 preferably contains additional software (not shown), which is not necessary to understanding the invention.

The peripheral bus 140 represents any bus that allows coupled peripheral devices to communicate with the processor 105. In one embodiment, the peripheral bus is the Peripheral Component Interconnect (PCI) bus. The peripheral devices $160_1$ to $160_K$ are devices that perform specialized tasks such as input/output interface and device control. Examples of peripheral devices include a network interface and a media interface. The network interface connects to communication channel such as the Internet. The Internet provides access to on-line service providers, Web browsers, and other network channels. The media interface provides access to audio and video devices. The mass storage device 150 includes CD ROM, floppy diskettes, and hard drives.

Figure 2A:
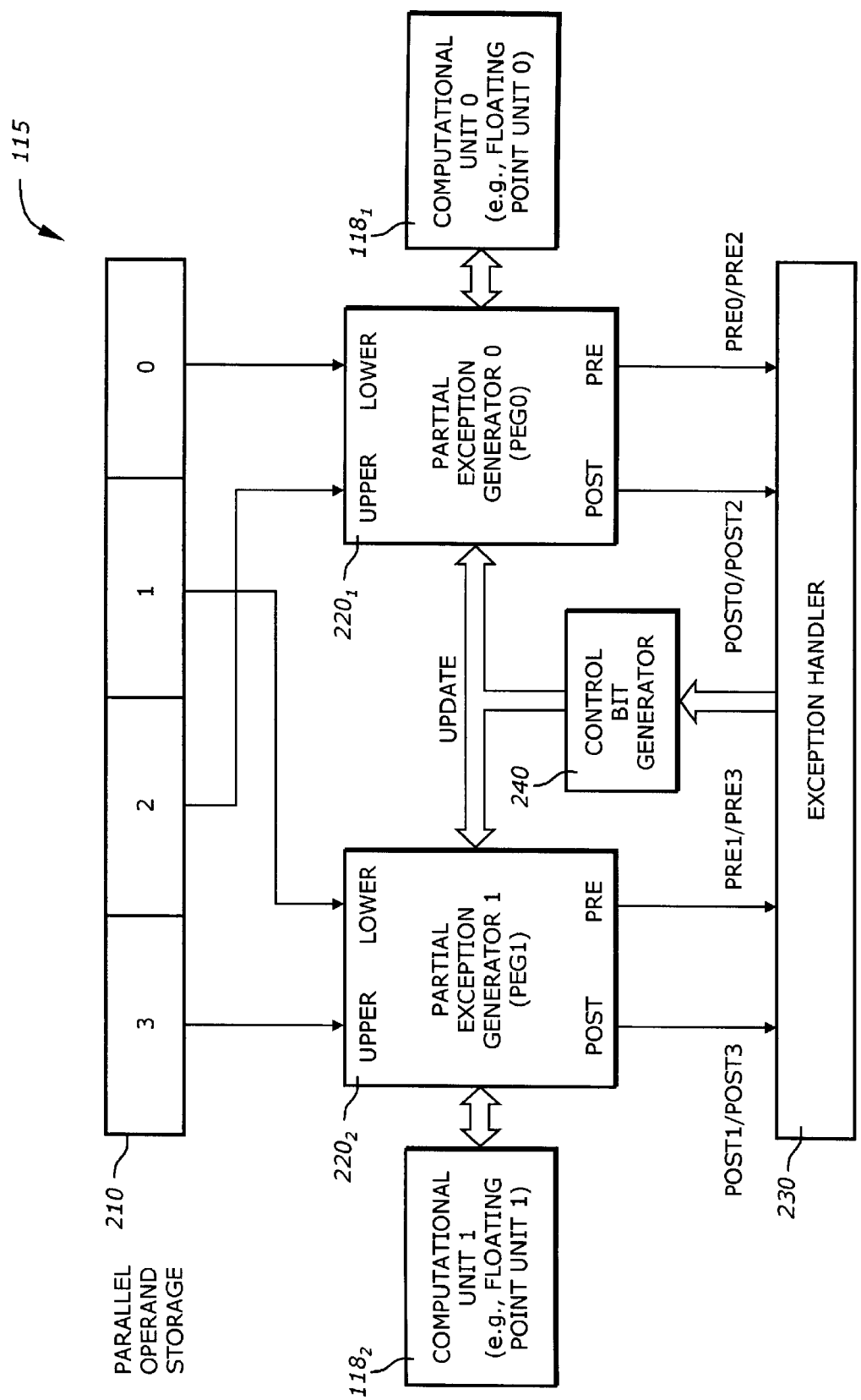
FIG. 2A is a diagram illustrating a parallel partial exception processor according to one embodiment of the invention.

FIG. 2A is a diagram illustrating a parallel partial exception processor 115 according to one embodiment of the invention. The partial exception processor 115 interfaces to a parallel operand storage 210 and computational units $118_1$ and $118_2$. The partial exception processor 115 includes two partial exception generators $220_1$ and $220_2$, an exception handler 230, and a control bit generator 240.

The parallel operand storage 210 stores multiple operands for parallel processing. In one embodiment, the parallel operand storage 210 stores 4 single-precision (SP) floating point (FP) numbers, each number being 32-bit. The lower half of the operands includes operands 0 and 1. The upper half of the operands include operands 2 and 3. Operands 0 and 2 go to the lower and upper inputs of the partial exception generator 0 $220_1$ and operands 1 and 3 go to the lower and upper inputs of the partial exception generator 0 $220_2$.

The two computational units 0 and 1 $118_1$ and $118_2$ are connected to the partial exception generators 0 and 1 $220_1$ and $220_2$, respectively, to process the input operands in parallel. The two computational units 0 and 1 $118_1$ and $118_2$ produce results and any exceptions (post-exceptions) from the operation on the operands.

The partial exception generator 0 (PEG0) $220_1$ receives the lower and upper operands 0 and 2 from the parallel operand storage 210 and generates PRE0/PRE2 signals on the PRE output and POST0/POST2 signals on the POST output. The PRE and POST outputs correspond to pre- and post-exceptions. As mentioned previously, the term pre- and post-exceptions in this context refer to pre-computation and post-computation exceptions, respectively. As is known by one skilled in the art, the present invention is also applicable for non-computational processes. The partial exception generator 1 (PEG1) $220_2$ receives the lower and upper operands 1 and 3 from the parallel operand storage 210 and generates PRE1/PRE3 signals on the PRE output and POST1/POST3 signals on the POST output. The PRE and POST outputs correspond to pre- and post-exceptions. Each of the PEG0 $220_1$ and PEG1 $220_2$ contains exception storage to store exception states.

The exception handler 230 receives the PRE0/PRE2, POST0/POST2, PRE1/PRE3, and POST1/POST3 signals from the PEG0 $220_1$ and PEG1 $220_2$ and process the corresponding exceptions. The exception handler 230 interfaces with the control bit generator 240 to provide the UPDATE signals to update the exception storage inside the PEG0 $220_1$ and PEG1 $220_2$.

The parallel partial exception processor 115 shown in FIG. 2A represents a processor having two groups of operands forming four-elements parallel operands. The parallel partial exception processor 115 can be generalized to accommodate other situations with more than two groups of operands, or more or less than two partial exception generators.

Figure 2B:
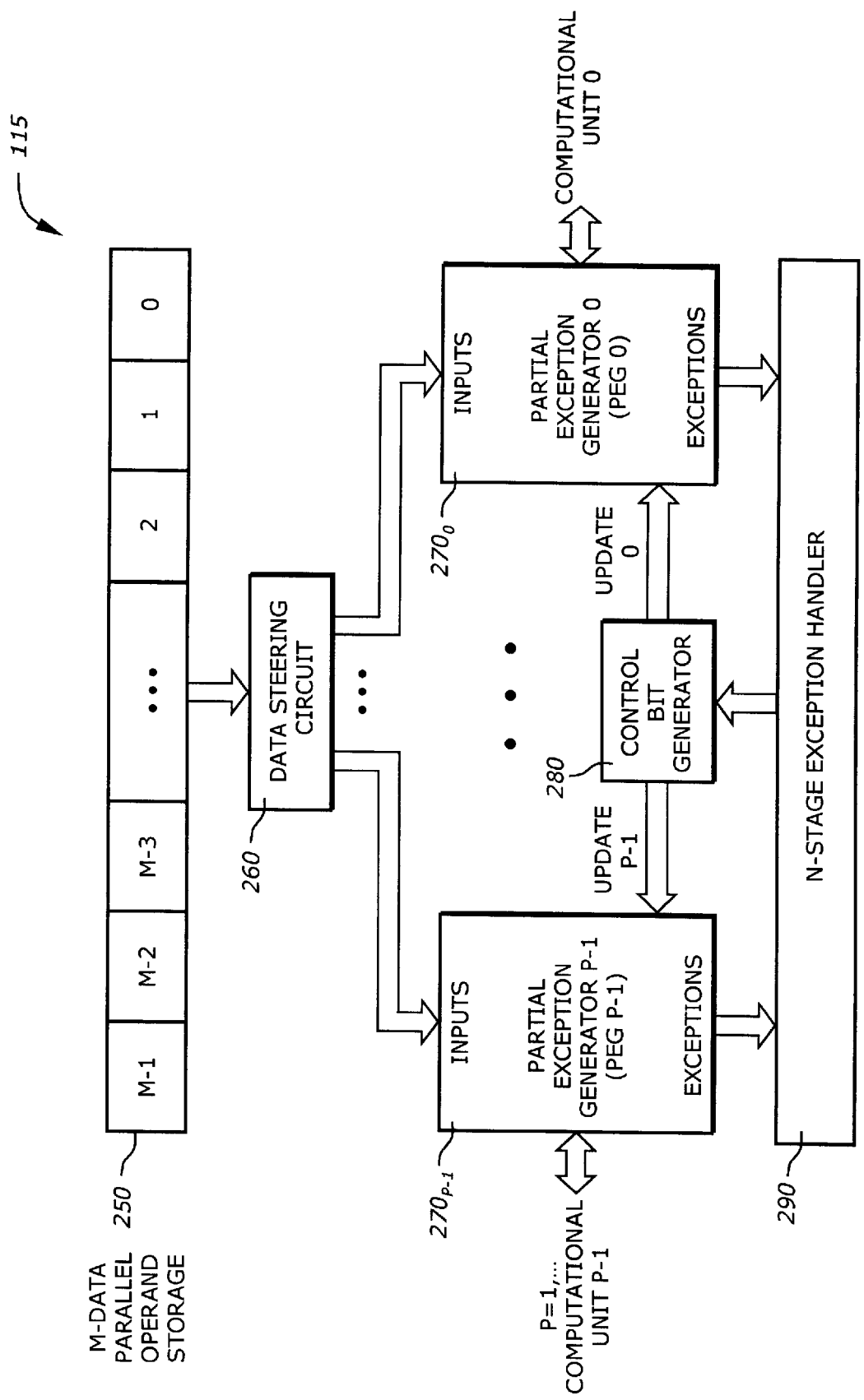
FIG. 2B is a diagram illustrating a generic parallel partial exception processor according to one embodiment of the invention.

FIG. 2B is a diagram illustrating a generic parallel partial exception processor 115 according to one embodiment of the invention. The generic parallel partial exception processor 115 includes an M-data parallel operand storage 250, a data steering circuit 260, P partial exception generators $270_0$ to $270_{P-1}$, a control bit generator 280, and an N-stage exception handler 290.

The M-data parallel operand storage 250 stores M data items from 0 to M−1. These data items represent the full parallel operands. For example, if the data items are SP FP numbers, then each data item is represented by a 32-bit number and the M-data parallel operand storage is 32*M-bit wide.

The data steering circuit 260 steers the data items in the M-data parallel operand storage to P partial exception generators $270_0$ to $270_{P-1}$. The data steering circuit 260 may be implemented simply by hardwiring the signal lines to fixed data paths, or alternatively by dynamically routing the signal lines via switching circuits with multiplexers or routing devices.

The P partial exception generators $270_0$ to $270_{P-1}$ generates N stages of exceptions. N is equal to M/P. For example, if there are 32 data items in the M-data parallel operand storage 250 (M=32) and there are 4 partial exception generators (P=4), then each partial exception generator processes eight groups of operands to produce full exceptions for all 32 data items because N=M/P=32/4=8.

Each of the partial exception generators $270_0$ to $270_{P-1}$ receives the operands as provided by the data steering circuit 260 and generates exceptions to the N-stage exception handler 290. Each of the partial exception generators $270_0$ to $270_{P-1}$ interfaces with a corresponding computational unit (e.g., a floating-point processor) to generate exceptions based on computational results.

The control bit generator 280 generates signals, UPDATE0 to UPDATE P–1, to update the exception storage in the partial exception generators $270_0$ to $270_{P-1}$. The control bit generator 280 is part of a control unit that generate control signals as dictated by the control microcode. In the exemplary embodiment shown in FIG. 2B, the control bit generator 280 is driven by the N-stage exception handler 290.

The N-stage exception handler 290 receives the exception signals as generated by the P partial exception generators $270_0$ to $270_{P-1}$ and provides appropriate code to service the exceptions. The exception code in the N-stage exception handler 290 provide control signals to the control bit generator 280 to update the exception storage inside the partial exception generators $270_0$ to $270_{P-1}$.

It is contemplated that the technique is applicable to any size of operands with any number of partial exception generators. However, for illustrative purposes, the following description uses the exemplary configuration as shown in FIG. 2A with four-elements input operands and two partial exception generators.

Figure 3:
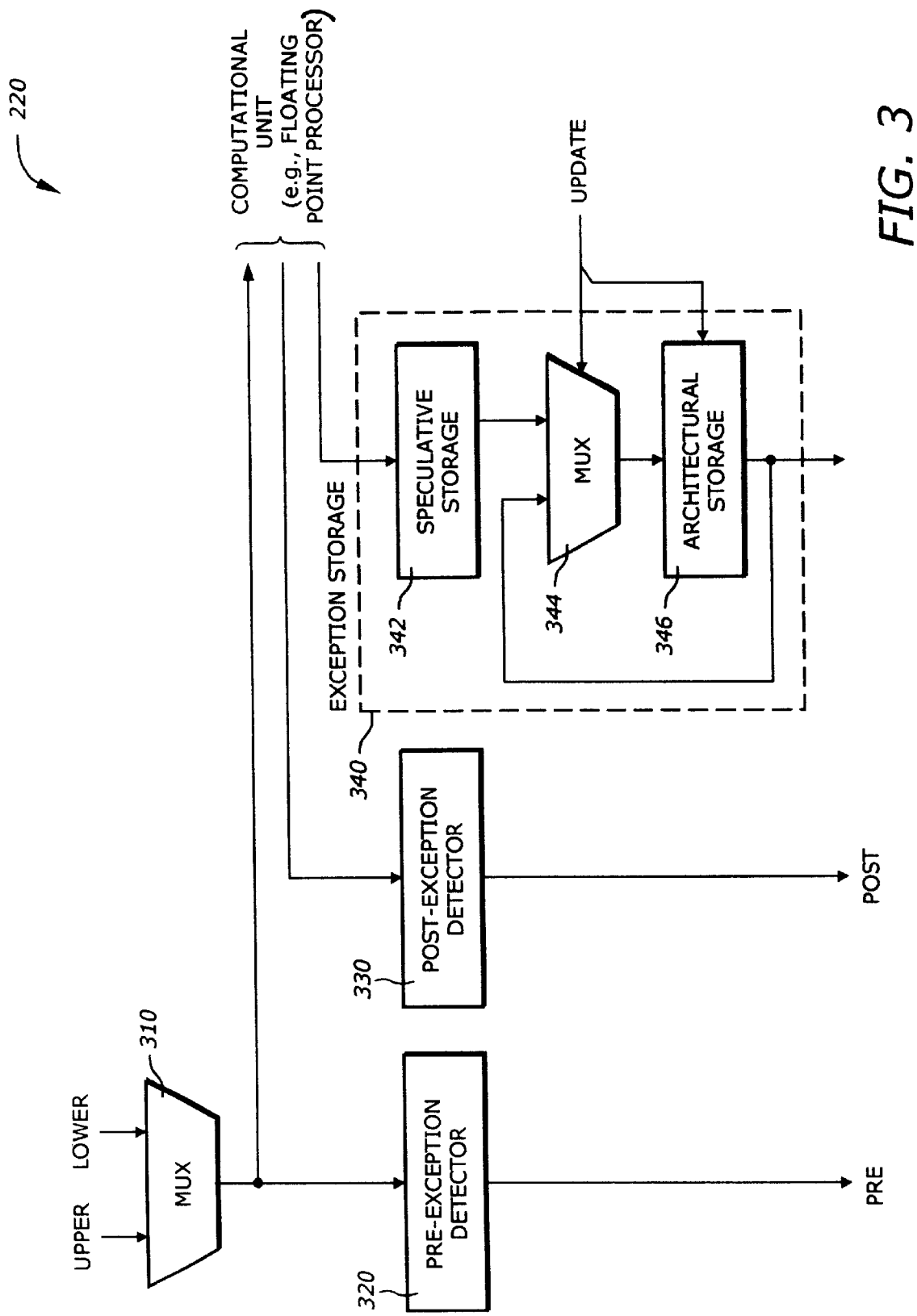
FIG. 3 is a diagram illustrating an exception generator according to one embodiment of the invention.

FIG. 3 is a diagram illustrating an exception generator 220 according to one embodiment of the invention. The exception generator 220 includes a multiplexer 310, a pre-exception detector 320, a post-exception detector 330, and an exception storage 340.

The multiplexer 310 selects one of the lower and upper operands. When there are N groups of operands in the parallel operand inputs, the multiplexer 310 selects one of the N groups. The selected operands go to the computational unit 118 (shown in FIG. 2) for processing. The computational unit 118 may process the operands before, at the same time, or after the pre-exception detection. In the exemplary embodiment shown in FIG. 3, the computational unit 118 processes the operands at the same time with the pre-exception detection to save time.

The pre-exception detector 320 detects a pre-exception condition on the input operand. A pre-exception condition is one in which there is exception even before the computational unit operates on the operands. Examples of these pre-exceptions include invalid number, not-a-number (NaN), and divide-by-zero. The pre-exception detector 320 includes logic circuits to detect these pre-determined pre-exception conditions. The pre-exception detector 320 generates a PRE signal to indicate that there is a pre-exception. Since the exception generator 220 generates exceptions partially, the pre-exception detector 320 detects pre-exception on one operand at a time according to the operand selection by the multiplexer 310. For the exemplary embodiment shown in FIG. 3, the pre-exception detector 320 detects two consecutive pre-exceptions, one on the lower operand and one on the upper operand. The PRE signal, therefore, is labeled PRE0/PRE2 or PRE1/PRE3 as shown in FIG. 2.

The post-exception detector 330 detects any post-exception condition on the result of the computational unit 118. A post-exception condition is one in which there is an exception as a result of the operation of the computational unit 118. Examples of post-exceptions include overflow and underflow. The post-exception detector 330 generates a POST signal to indicate that there is a post-exception. Since the exception generator 220 generates exceptions partially, the post-exception detector 330 detects post-exception on one result operand at a time according to the computational unit 118. For the exemplary embodiment shown in FIG. 3, the post-exception detector 330 detects two consecutive pre-exceptions, one on the lower operand and one on the upper operand. The POST signal, therefore, is labeled POST0/POST2 or POST1/POST3 as shown in FIG. 2A.

The exception storage 340 stores the exception states as generated by the computational unit including any pre-exception states. The exception storage 340 includes a speculative storage 342, a multiplexer 344, and an architectural storage 346.

The speculative storage 342 stores any exception states (pre- or post-) that are of temporary nature, or speculatively observed. The multiplexer 344 selects one of the sources from the speculative and architectural storages 342 and 346 to transfer to the architectural storage 346. The architectural storage 346 stores the architectural exception states. The multiplexer 344 and the architectural storage 346 are controlled by the UPDATE signal. The UPDATE signal is generated from the control unit 240 shown in FIG. 2A. In one embodiment, the UPDATE signal is generated as a result of executing an explicit update instruction in the microcode unit of the exception handler.

Figure 4:
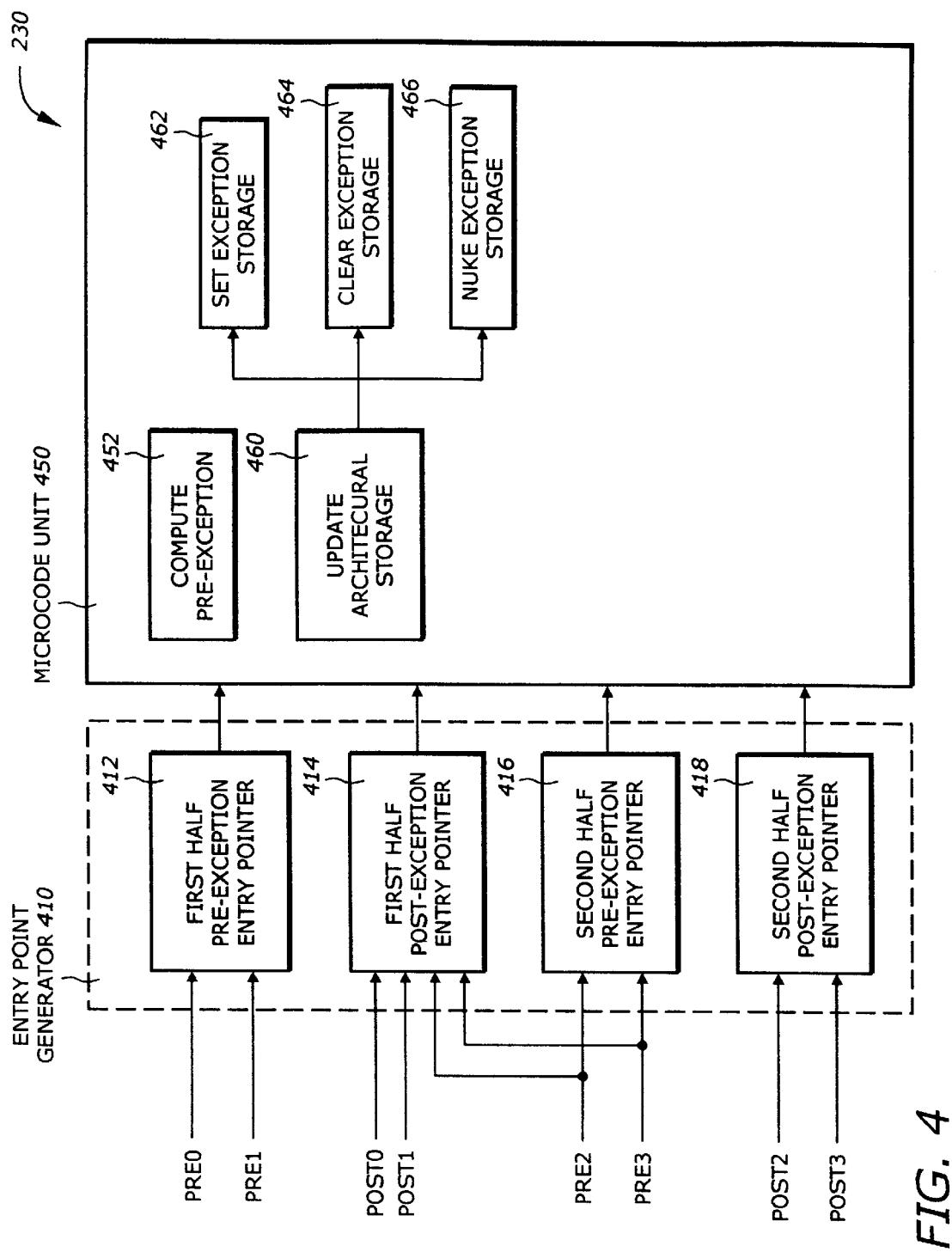
FIG. 4 is a diagram illustrating an exception handler according to one embodiment of the invention.

FIG. 4 is a diagram illustrating an exception handler 230 according to one embodiment of the invention. The exception handler 230 handles the exceptions as detected by the exception generator 220 shown in FIGS. 2 and 3. The exception handler 230 includes an entry-point generator 410 and a microcode unit 450.

The entry-point generator 410 generates entry points to the microcode residing in the microcode unit 450 to service the corresponding exceptions. The entry-point generator 410 may include a logic circuit such as a programmable logic device or a look-up table to provide the entry points. For the exemplary embodiment shown in FIG. 4, the entry-point generator 410 includes a first-half pre-exception entry pointer 412, a first-half post-exception entry pointer 414, a second-half pre-exception entry pointer 416, and a second-half post-exception entry pointer 418. The first-half pre-exception entry pointer 412 provides the entry point or the microcode starting address for the first-half pre-exceptions. The first-half post-exception entry pointer 414 provides the entry point or the microcode starting address for the first-half post-exceptions. The second-half pre-exception entry pointer 416 provides the entry point or the microcode starting address for the second-half pre-exceptions. The second-half post-exception entry pointer 418 provides the entry point or the microcode starting address for the second-half post-exceptions.

The microcode unit 450 is part of a control unit to store microcode servicing the exceptions. The microcode unit 450 includes a compute pre-exception code 452, an update architectural storage code 560. The compute pre-exception code 452 computes the pre-exceptions according to the type of pre-exception. The update architectural storage code 460 updates the architectural storage 346 shown in FIG. 3. The update architectural storage code 460 includes explicit update instructions such as a set exception storage instruction 462 (e.g., SET_MXCSR), a clear exception storage instruction 464 (e.g., CLR_MXSCR), and a nuke exception storage instruction 466 (e.g., NUKE_MXCSR). The set exception storage instruction 462 sets the exception bits in the exception storage as required by the microcode. The clear exception storage instruction 464 clears the exception bits in the exception storage as required by the microcode. The nuke exception storage instruction 466 unrolls the effects of the first-half post exceptions on the speculative storage. For example, if there is any pre-exception on any of the operands, none of the post-exceptions is computed.

For illustrative purposes, it is sufficient to describe the technique in a two-stage process, i.e., there are two groups of parallel operands performed in two consecutive stages. The first stage corresponds to the first half of the operands and the second stage corresponds to the second half of the operands. Alternative embodiments can be implemented in a multi-stage process.

Figure 5:
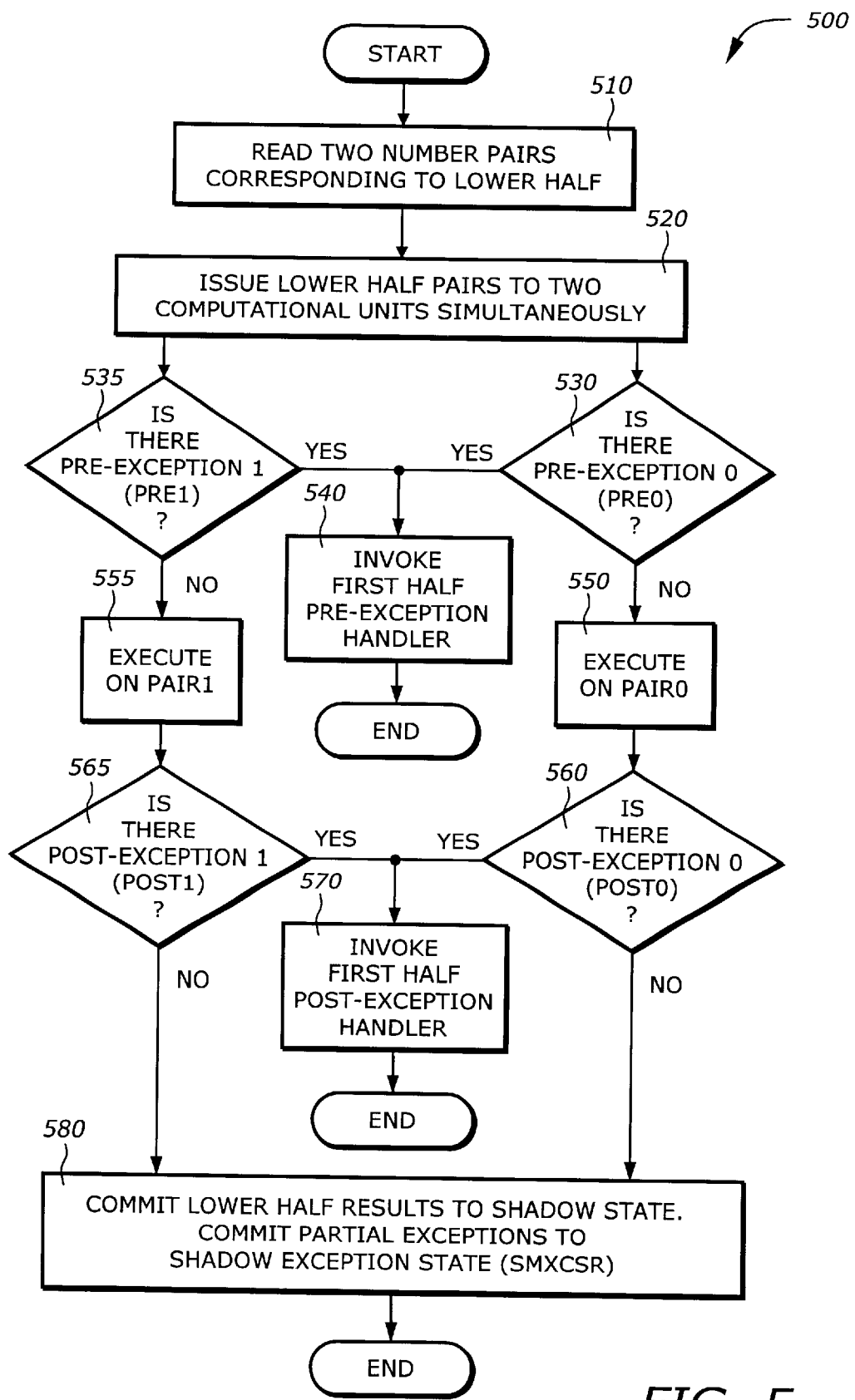
FIG. 5 is a flowchart illustrating a process to generate first-half exceptions according to one embodiment of the invention.

FIG. 5 is a flowchart illustrating a process 500 to generate first-half exceptions according to one embodiment of the invention.

Upon START, the process 500 reads two number pairs corresponding to the lower half of the parallel input operand storage (Block 510). The process 500 then issues the lower half pairs to two computational units simultaneously (Block 520).

Next the process 500 determines in parallel if there is a pre-exception in pair 0 (Block 530) and if there is a pre-exception in pair 1 (Block 535). If there is a pre-exception, the process 500 invokes the first-half pre-exception handler (Block 540) and is then terminated.

If there is no pre-exception on pair 0, the process 500 proceeds to execute the operation by the computational unit on pair 0 (Block 550). Similarly, if there is no pre-exception on pair 1, the process 500 proceeds to execute the operation by the computational unit on pair 1 (Block 555).

Next, the process 500 determines if there is a post-exception in pair 0 (Block 560) and pair 1 (Block 565). Blocks 560 and 565 can be performed in parallel if the process completes blocks 550 and 555 at the same time. If there is a post-exception in pair 0 or pair 1, the process 500 invokes the first-half post-exception handler (Block 570) and is then terminated.

If there is no post-exception in pair 0 or pair 1, the process 500 proceeds to commit the lower half results into the shadow state (i.e., store the results in some temporary storage) and the partial exceptions in a partial exception state (i.e., store in some temporary or speculative storage ). Then the process 500 is terminated.

Figure 6:
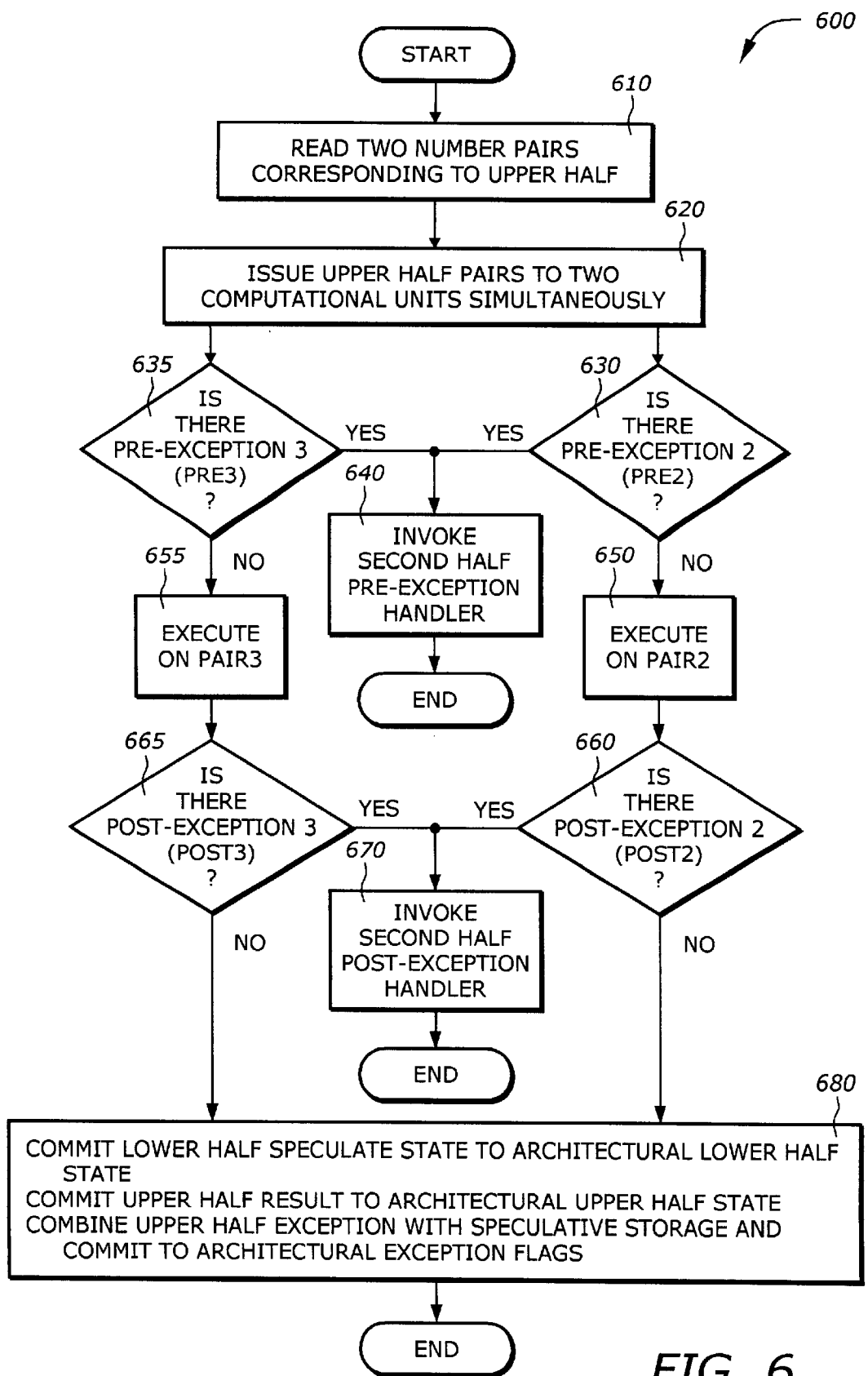
FIG. 6 is a flowchart illustrating a process to generate second-half exceptions according to one embodiment of the invention.

FIG. 6 is a flowchart illustrating a process 600 to generate second-half exceptions according to one embodiment of the invention.

Upon START, the process 600 reads two number pairs corresponding to the upper half of the parallel input operand storage (Block 610). The process 600 then issues the upper half pairs to two computational units simultaneously (Block 620).

Next the process 600 determines in parallel if there is a pre-exception in pair 2 (Block 530) and if there is a pre-exception in pair 3 (Block 635). If there is a pre-exception, the process 600 invokes the second-half pre-exception handler (Block 640) and is then terminated.

If there is no pre-exception on pair 2, the process 600 proceeds to execute the operation by the computational unit on pair 2 (Block 650). Similarly, if there is no pre-exception on pair 3, the process 600 proceeds to execute the operation by the computational unit on pair 3 (Block 655).

Next, the process 600 determines if there is a post-exception in pair 2 (Block 660) and pair 3 (Block 665). Blocks 660 and 665 can be performed in parallel if the process completes blocks 650 and 655 at the same time. If there is a post-exception in pair 2 or pair 3, the process 600 invokes the second-half post-exception handler (Block 670) and is then terminated.

If there is no post-exception in pair 2 or pair 3, the process 600 proceeds to (1) commit the lower half speculative state to architectural lower half state, (2) commit the upper half result to the architectural upper half state, (3) combine the upper half exception with speculative storage, and finally (4) commit to the architectural exception flags (Block 680). Then the process 500 is terminated.

Figure 7A:
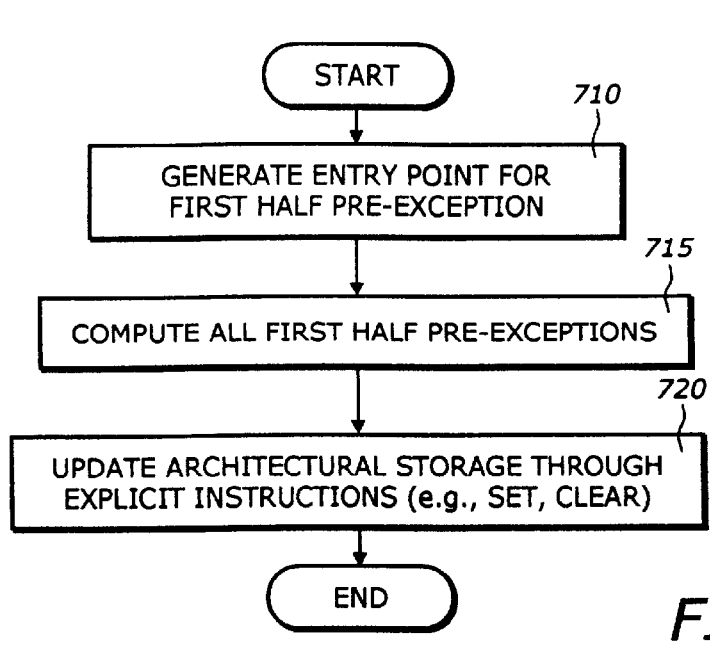
FIG. 7A is a flowchart illustrating a process to handle the first-half pre-exceptions according to one embodiment of the invention.

FIG. 7A is a flowchart illustrating a process 540 to handle the first-half pre-exceptions according to one embodiment of the invention.

Upon START, the process 540 generates the entry point for the first half pre-exception code (Block 710). The entry point may be hard-coded, hardwired, or looked up in a memory. The entry point provides the starting address of the corresponding microcode in the microcode unit. In addition to perform the necessary tasks to service the exceptions, this microcode allows the process 540 computes all the first-half pre-exceptions as detected in the corresponding code (Block 715). Next, the process 540 updates the architectural storage by executing explicit instructions such as set exception storage and clear exception storage (Block 720). Then the process 540 is terminated.

Figure 7B:
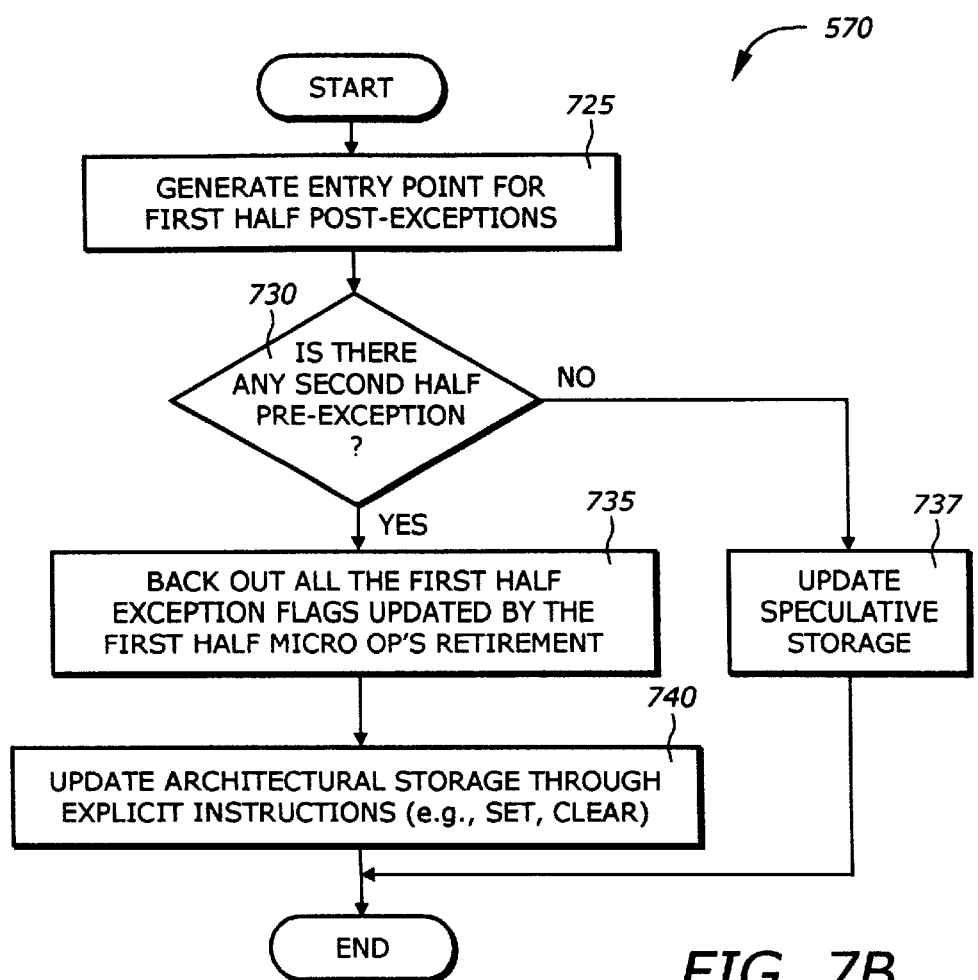
FIG. 7B is a flowchart illustrating a process to handle the first-half post-exceptions according to one embodiment of the invention.

FIG. 7B is a flowchart illustrating a process 570 to handle the first-half post-exceptions according to one embodiment of the invention.

Upon START, the process 570 generates the entry point for the first half post-exception code (Block 725). The entry point may be hard-coded, hardwired, or looked up in a memory. The entry point provides the starting address of the corresponding microcode in the microcode unit. Then the process 570 determines if there is any second-half pre-exception (Block 730). Due to pipelining, the first-half post-exception stage occurs at or near the time of the second-half pre-exception stage. If there are no second-half pre-exceptions, the process 570 updates the speculative storage to reflect the first-half post-exception states (Block 737) and the process 570 is terminated.

If there is a second-half pre-exception, the process 570 backs out all the first-half exception flags which are updated by the first-half micro op's retirement (Block 735). This backing out or unrolling can be done by executing an explicit instruction such as the nuke exception storage instruction. Then the process 570 updates the architectural storage through explicit instructions such as set and clear exception storage instructions (Block 740). Then the process 570 is terminated.

Figure 7C:
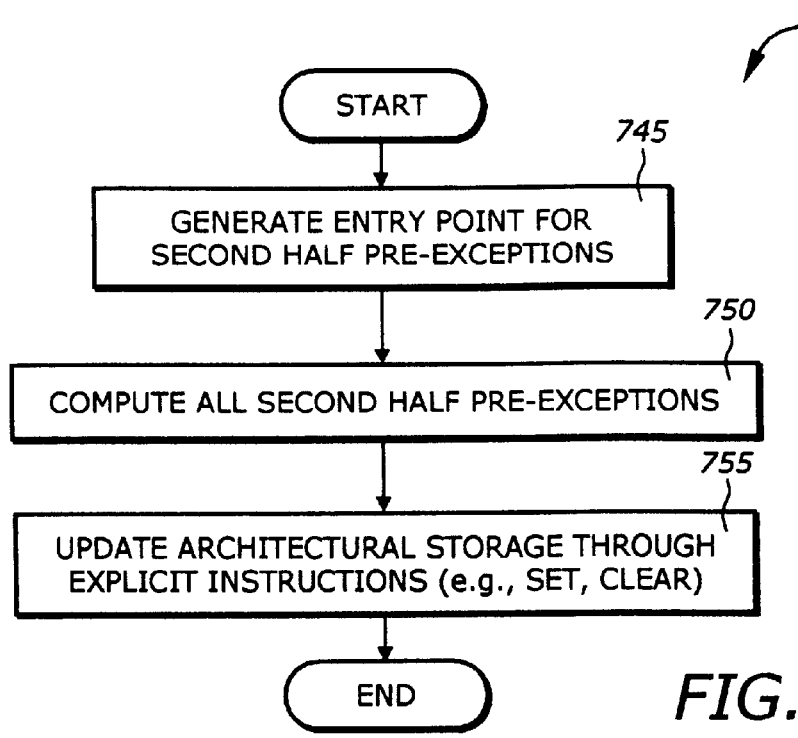
FIG. 7C is a flowchart illustrating a process to handle the second-half pre-exceptions according to one embodiment of the invention.

FIG. 7C is a flowchart illustrating a process 640 to handle the second-half pre-exceptions according to one embodiment of the invention.

Upon START, the process 640 generates the entry point for the second half pre-exception code (Block 745). The entry point may be hard-coded, hardwired, or looked up in a memory. The entry point provides the starting address of the corresponding microcode in the microcode unit. In addition to perform the necessary tasks to service the exceptions, this microcode allows the process 640 computes all the second-half pre-exceptions as detected in the corresponding code (Block 750). Next, the process 640 updates the architectural storage by executing explicit instructions such as set exception storage and clear exception storage (Block 755). Then the process 640 is terminated.

Figure 7D:
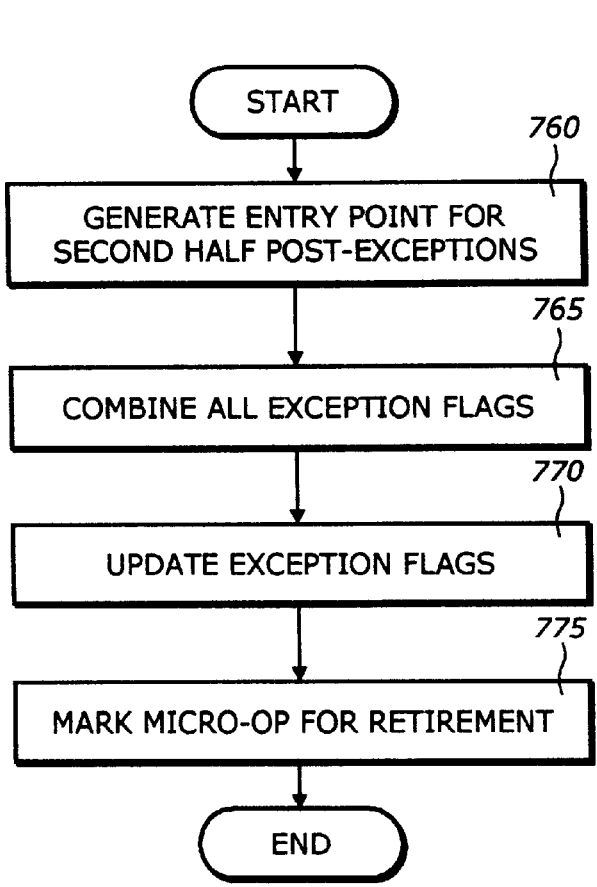
FIG. 7D is a flowchart illustrating a process to handle the second-half post-exceptions according to one embodiment of the invention.

FIG. 7D is a flowchart illustrating a process 670 to handle the second-half post-exceptions according to one embodiment of the invention.

Upon START, the process 670 generates the entry point for the second half post-exception code (Block 760). The entry point may be hard-coded, hardwired, or looked up in a memory. The entry point provides the starting address of the corresponding microcode in the microcode unit. Then the process 670 combines all the exception flags as determined by all the first and second exceptions (Block 765). Next, the process 670 updates the exception flags (Block 770). Then the process 670 marks the micro-op for retirement (Block 775). Then the process 670 is terminated.

Thus, the present invention is a technique to process full exceptions in a micro architecture that has partial processing units. The technique breaks the full parallel operands into stages and process each stage at a time. Pre- and post-exceptions are detected and processed. Speculative and architectural storages are used to update the exception states. The final stage of exception processing combines all the exception flags. The technique provides compatibility with processors having full exception capability.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    generating P partial exception states including at least one of a pre-exception state and a post-exception state for P partial exceptions from a partial parallel processor operating on N groups of parallel operands, the P partial exceptions corresponding to full exceptions; and
    handling the P partial exceptions based on the P partial exception states.

2. The method of claim 1 further comprising:
    storing one of the P partial exception states in an exception storage.

3. The method of claim 2 wherein handling comprises:
    generating an entry point to a handler code corresponding to one of the P partial exceptions; and
    executing the handler code to update the exception storage based on one of the P partial exception states.

4. The method of claim 3 wherein handling further comprising:
    combining exception flags caused by the P partial exceptions.

5. The method of claim 4 wherein the exception storage includes a speculative storage and an architectural storage.

6. The method of claim 5 wherein generating the P partial exception states comprises:
    generating one of the P partial exception states.

7. The method of claim 6 wherein generating the one of the P partial exception states comprises:
    detecting a pre-exception before the partial parallel processor operates on a corresponding group of N groups of parallel operands, the pre-exception producing the pre-exception state;
    storing the pre-exception state in the speculative storage; and
    detecting a post-exception after the partial parallel processor operates on the corresponding group of N groups of parallel operands, the post-exception producing the post-exception state.

8. The method of claim 7 wherein generating the entry point comprises:
    generating a pre-exception entry point to a pre-exception handler code; and
    generating a post-exception entry point to a post-exception handler code.

9. The method of claim 8 wherein executing the handler code comprises:
    executing the pre-exception handler code; and
    executing the post-exception handler code.

10. The method of claim 9 wherein executing the pre-exception handler code comprises:
    computing a pre-exception result corresponding to the pre-exception; and
    updating the architectural storage.

11. The method of claim 10 wherein executing the post-exception handler code comprises:
    computing a pending pre-exception result corresponding to a next pre-exception; and
    updating the architectural storage.

12. The method of claim 11 wherein combining the exception flags comprises:
    combining the exception flags if the one of the P partial exceptions corresponds to a last post-exception.

13. The method of claim 12 wherein updating the architectural storage comprises executing an explicit update instruction.

14. The method of claim 13 wherein the explicit update instruction is one of a set, a clear, and a nuke instructions.

15. The method of claim 1 further comprising:
    steering one of the N groups of parallel operands to the partial parallel processor.

16. The method of claim 15 wherein the partial parallel processor is a floating-point unit.

17. The method of claim 1 wherein the parallel operands include M data items, M being equal N*P, M, N and P being integers.

18. An apparatus comprising:
    a partial exception generator to generate P partial exception states including at least one of a pre-exception state and a post-exception state for P partial exceptions from a partial parallel processor operating on N groups of parallel operands, the P partial exceptions corresponding to full exceptions; and
    an exception handler coupled to the partial exception generator to handle the P partial exceptions based on the P partial exception states.

19. The apparatus of claim 18 wherein the partial exception generator comprises:
    an exception storage storing one of the P partial exception states in an exception storage.

20. The apparatus of claim 19 wherein the exception handler comprises:
    an entry point generator to generate an entry point to a handler code corresponding to one of the P partial exceptions; and
    a microcode unit coupled to the entry point generator to execute the handler code to update the exception storage based on one of the P partial exception states.

21. The apparatus of claim 20 wherein the microcode unit comprises a combine code to combine exception flags caused by the P partial exceptions.

22. The apparatus of claim 21 wherein the exception storage includes a speculative storage and an architectural storage.

23. The apparatus of claim 22 wherein the partial exception generator generates one of the P partial exception states.

24. The apparatus of claim 23 wherein the partial exception generator further comprises:
    a pre-exception detector to detect a pre-exception before the partial parallel processor operates on a corresponding group of N groups of parallel operands, the pre-exception producing the pre-exception state, the pre-exception state being stored in the speculative storage; and a post-detection detector coupled to the partial parallel processor to detect a post-exception after the partial parallel processor operates on the corresponding group of N groups of parallel operands, the post-exception producing the post-exception state.

25. The apparatus of claim 24 wherein the entry point generator comprises:
a pre-exception entry pointer to generate a pre-exception entry point to a pre-exception handler code; and
a post-exception entry pointer to generate a post-exception entry point to a post-exception handler code.

26. The apparatus of claim 25 wherein the microcode unit comprises:
a pre-exception code to execute the pre-exception handler code; and
a post-exception code to execute the post-exception handler code.

27. The apparatus of claim 26 wherein the pre-exception code comprises:
code to compute a pre-exception result corresponding to the pre-exception; and
code to update the architectural storage.

28. The apparatus of claim 27 wherein the post-exception code comprises:
code to compute a pending pre-exception result corresponding to a next pre-exception; and
code update the architectural storage.

29. The apparatus of claim 28 wherein the combine code comprises:
code to combine the exception flags if the one of the P partial exceptions corresponds to a last post-exception.

30. The apparatus of claim 29 wherein code to update the architectural storage comprises code to execute an explicit update instruction.

31. The apparatus of claim 30 wherein the explicit update instruction is one of a set, a clear, and a nuke instructions.

32. The apparatus of claim 18 further comprising:
a data steering circuit coupled to the partial parallel processor to steer one of the N groups of parallel operands to the partial parallel processor.

33. The apparatus of claim 32 wherein the partial parallel processor is a floating-point unit.

34. The apparatus of claim 18 wherein the parallel operands include M data items, M being equal N*P, M, N and P being integers.

35. A system comprising:
a computational unit to perform an operation on one of N groups of parallel operands;
a circuit coupled to the computational unit to process full exceptions in the computational unit for the parallel operands, the circuit comprising:
a partial exception generator to generate P partial exception states including at least one of a pre-exception state and a post-exception state for P partial exceptions from a partial parallel processor operating on the N groups of the parallel operands, the P partial exceptions corresponding to the full exceptions; and
an exception handler coupled to the partial exception generator to handle the P partial exceptions based on the P partial exception states.

36. The system of claim 35 wherein the partial exception generator comprises:
an exception storage storing one of the P partial exception states in an exception storage.

37. The system of claim 36 wherein the exception handler comprises:
an entry point generator to generate an entry point to a handler code corresponding to one of the P partial exceptions; and a microcode unit coupled to the entry point generator to execute the handler code to update the exception storage based on one of the P partial exception states.

38. The system of claim 37 wherein the microcode unit comprises a combine code to combine exception flags caused by the P partial exceptions.

39. The system of claim 38 wherein the exception storage includes a speculative storage and an architectural storage.

40. The system of claim 39 wherein the partial exception generator generates one of the P partial exception states.

41. The system of claim 40 wherein the partial exception generator comprises:
a pre-exception detector to detect a pre-exception before the partial parallel processor operates on a corresponding group of N groups of parallel operands, the pre-exception producing the pre-exception state, the pre-exception state being stored in the speculative storage; and
a post-detection detector coupled to the partial parallel processor to detect a post-exception after the partial parallel processor operates on the corresponding group of N groups of parallel operands, the post-exception producing the post-exception state.

42. The system of claim 41 wherein the entry point generator comprises:
a pre-exception entry pointer to generate a pre-exception entry point to a pre-exception handler code; and
a post-exception entry pointer to generate a post-exception entry point to a post-exception handler code.

43. The system of claim 42 wherein the microcode unit comprises:
a pre-exception code to execute the pre-exception handler code; and
a post-exception code to execute the post-exception handler code.

44. The system of claim 43 wherein the pre-exception code comprises:
code to compute a pre-exception result corresponding to the pre-exception; and
code to update the architectural storage.

45. The system of claim 44 wherein the post-exception code comprises:
code to compute a pending pre-exception result corresponding to a next pre-exception; and
code update the architectural storage.

46. The system of claim 45 wherein the combine code comprises:
code to combine the exception flags if the one of the P partial exceptions corresponds to a last post-exception.

47. The system of claim 46 wherein code to update the architectural storage comprises code to execute an explicit update instruction.

48. The system of claim 47 wherein the explicit update instruction is one of a set, a clear, and a nuke instructions.

49. The system of claim 35 further comprising:
a data steering circuit coupled to the partial parallel processor to steer one of the N groups of parallel operands to the partial parallel processor.

50. The system of claim 49 wherein the partial parallel processor is a floating-point unit.

51. The system of claim 35 wherein the parallel operands include M data items, M being equal N*P, M, N and P being integers.

* * * * *